(12) United States Patent
Porter

(10) Patent No.: US 6,357,816 B1
(45) Date of Patent: Mar. 19, 2002

(54) BUMPER BEAM EXTENSIONS

(75) Inventor: Marshall Ray Porter, Oakdale, IL (US)

(73) Assignee: Conix Corporation, Dearborn, MI (US)

( * ) Notice: Subject to any disclaimer, the term of this patent is extended or adjusted under 35 U.S.C. 154(b) by 0 days.

(21) Appl. No.: 09/743,546

(22) PCT Filed: Jul. 27, 1999

(86) PCT No.: PCT/US99/16947

§ 371 Date: Jan. 10, 2001

§ 102(e) Date: Jan. 10, 2001

(87) PCT Pub. No.: WO00/06423

PCT Pub. Date: Feb. 10, 2000

Related U.S. Application Data
(60) Provisional application No. 60/094,527, filed on Jul. 29, 1998.

(51) Int. Cl.[7] .......................... B60R 19/02; B60R 19/04; B60R 19/42
(52) U.S. Cl. ................. 296/102; 296/122; 296/126; 296/154
(58) Field of Search ................ 293/120, 122, 293/102, 154, 126

(56) References Cited

U.S. PATENT DOCUMENTS

| | | | | |
|---|---|---|---|---|
| 3,829,141 A | * | 8/1974 | Igwe ...................... | 293/107 |
| 3,861,728 A | * | 1/1975 | Haberle et al. ........... | 293/126 |
| 4,111,478 A | * | 9/1978 | Pompei et al. ........... | 293/126 |
| 4,130,312 A | * | 12/1978 | Cooper, Sr. .............. | 293/153 |
| 4,167,282 A | * | 9/1979 | Matsuyama ............. | 293/120 |
| 4,225,167 A | * | 9/1980 | Buettner et al. ......... | 293/120 |
| 4,350,221 A | * | 9/1982 | Ishima ..................... | 293/126 |
| 4,422,680 A | * | 12/1983 | Goupy ..................... | 293/122 |
| 4,597,601 A | * | 7/1986 | Manning .................. | 293/122 |
| 4,652,032 A | * | 3/1987 | Smith ....................... | 293/120 |
| 4,951,986 A | * | 8/1990 | Hanafusa et al. ......... | 293/120 |
| 5,498,045 A | * | 3/1996 | Morgan et al. ........... | 293/122 |
| 5,788,297 A | * | 8/1998 | Sugawara et al. ........ | 293/102 |
| 5,997,057 A | * | 12/1999 | Gasko et al. ............. | 293/102 |
| 6,000,738 A | * | 12/1999 | Stewart et al. ........... | 293/102 |
| 6,042,163 A | * | 3/2000 | Reiffer .................... | 293/102 |
| 6,217,089 B1 | * | 4/2001 | Goto et al. ............... | 293/102 |

* cited by examiner

Primary Examiner—Steven T. Gordon
Assistant Examiner—Hilary Gutman
(74) Attorney, Agent, or Firm—Banner & Witcoff, Ltd.

(57) ABSTRACT

A bumper beam extension for a bumper beam having left and right bumper beam extensions and a method for manufacturing the bumper beam extensions to provide impact crush resistance is disclosed. The bumper beam extensions include an insert end contoured and sized to fit in the end of the bumper beam and a main body portion having substantially a rearwardly facing saddle shape that includes an upper wing and a lower wing joined at a bight section. The main body portion is blow molded to configure the bight section to taper from a preselected distance from a forward wall of the main body portion until it is face to face with the forward wall. For increased stiffness, the bumper beam may be welded to a frame of a vehicle.

10 Claims, 4 Drawing Sheets

BUMPER BEAM EXTENSIONS

This Application is a 371 of PCT/US99/16947 filed Jul. 27, 1999 which claims benefit of Provisional No. 60/094,527 filed Jul. 29, 1998.

FIELD OF INVENTION

This invention relates to a bumper beam extension.

BACKGROUND OF THE INVENTION

In many current production vehicles, the front bumper system comprises a bumper impact beam mounted to the frame of a vehicle and covered by a fascia mounted to the vehicle body. The bumper beam must extend outside the rails of the frame to protect the vehicle during 30° corner impact tests as mandated by the FMVSS (Federal Motor Vehicle Safety Standards). The bumper beam cannot be attached to the frame at the frame factory without greatly reducing the shipping density of the frame. Therefore, the bumper beam is typically shipped separately to the assembly plant and then attached to the frame. If the bumper beam could be attached at the frame factory, it could be welded to the frame, thus providing increasing stiffness and crash integrity.

Referring to FIG. 4, some vehicles have incorporated a small blow molded end cap 50 attached to the end of the bumper beam 12 which supports the side of the fascia 18 as it extends around to the body. In the prior art, the end cap 50 does not perform any significant crush resistance. Energy absorbing foam 16 may be added to the bumper beam 12. Additional energy absorbing foam may be added forward of the end cap to support the fascia 18 during impact. However, such additions only take up space and do not provide any substantial crush resistance improvement. Thus, there is a need for a bumper beam extension that aids in providing crush resistance.

SUMMARY OF THE INVENTION

The disadvantages of the prior art may be overcome by providing a bumper beam having three parts: a center beam, a left side beam extension, and a right side beam extension. The center beam can be welded to the frame for increased stiffness and shipped with the frame from the frame factory at no additional shipping cost. The left and right side beam extensions provide 30° corner impact resistance.

According to one aspect of the invention, there is provided a bumper beam extension comprising a body having a first end configured to be inserted into an end of a bumper beam and an opposite end contoured to support a fascia. The body is shaped to provide structural rigidity.

BRIEF DESCRIPTION OF THE DRAWINGS

In drawings which illustrate an embodiment of the invention.

DETAILED DESCRIPTION OF PREFERRED EMBODIMENTS

Figure 1:
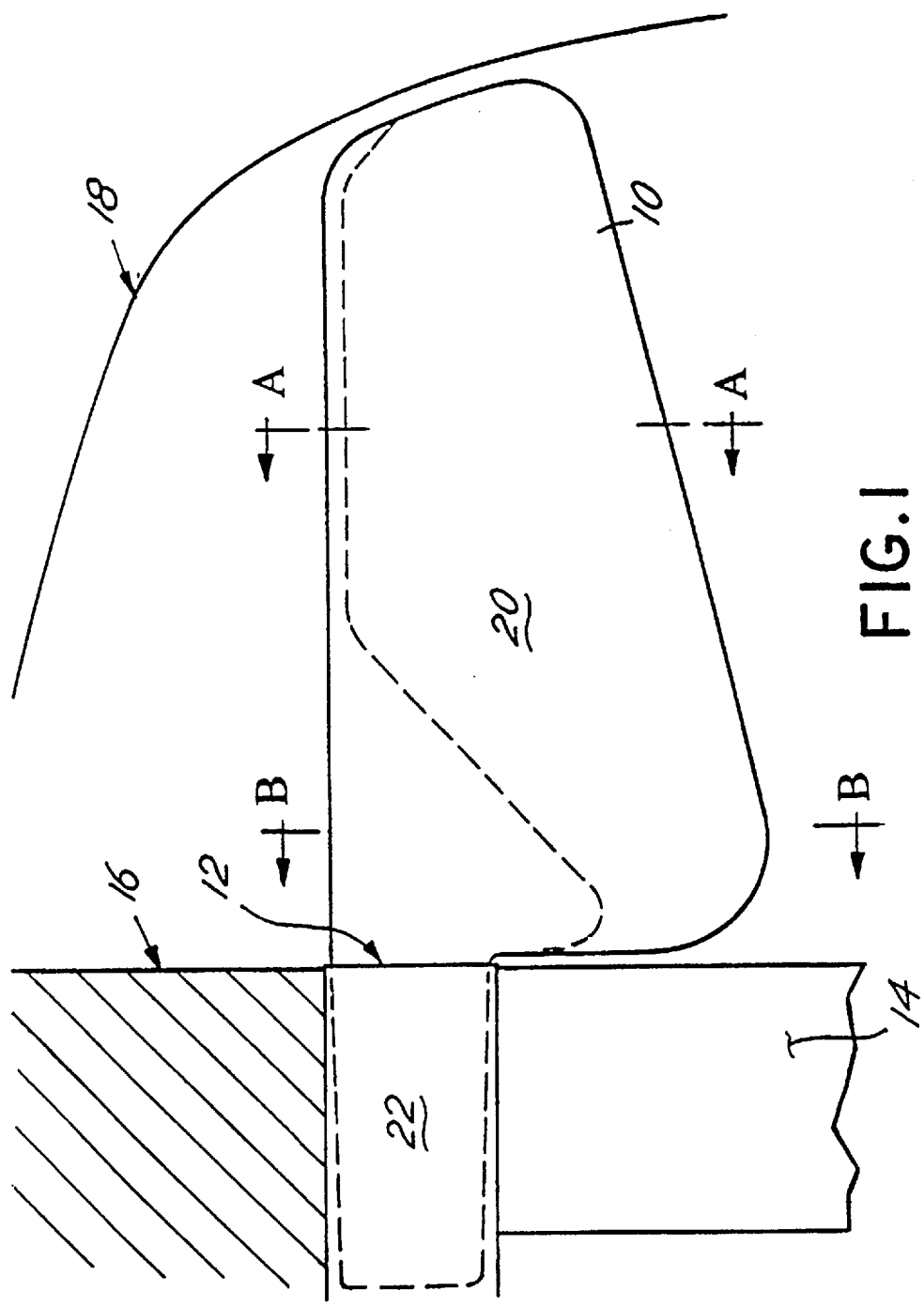
FIG. 1 is a top plan view, partly in section, of a blow molded bumper beam extension of the present invention.

The bumper beam extension 10 of the present invention is illustrated in FIG. 1. The bumper beam extension 10 is fitted in the end of a bumper beam 12. Bumper beam 12 is connected forwardly of a frame rail 14. Forwardly of the bumper beam 12 is a shaped mass of energy absorbing foam 16. Forwardly of the energy absorbing foam 16 is a fascia 18. The construction and assembly of the bumper beam 12, frame rail 14, energy absorbing foam 16 and fascia 18 is convention and well known in the art.

The bumper beam extension 10 comprises a main body portion 20 and an insert end 22. The insert end 22 is contoured and sized to fit in the end of the bumper beam 12 in a frictional or interference fit or otherwise secured with a positive attachment.

Figure 2:
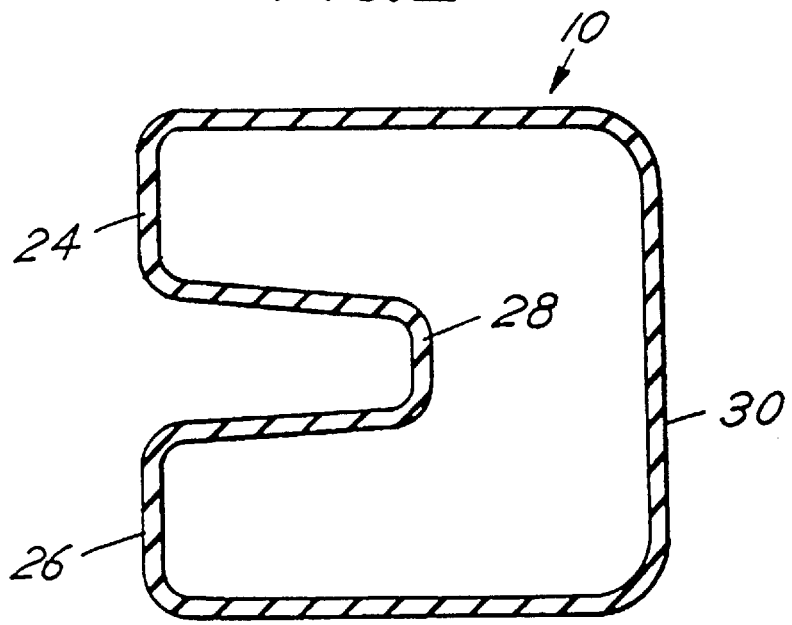
FIG. 2 is sectional view of the blow molded bumper beam extension of FIG. 1, along the line B—B.
Figure 3:
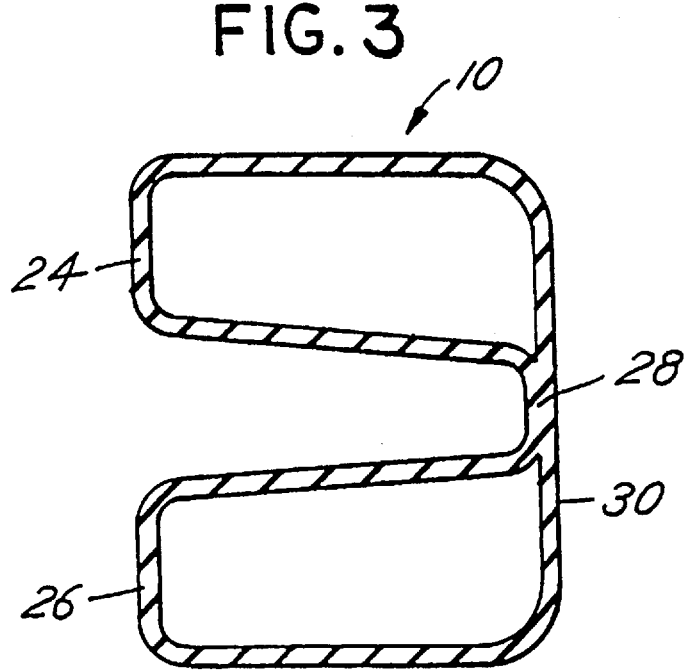
FIG. 3 is sectional view of the blow molded bumper beam extension of FIG. 1, along the A—A.
Figure 4:
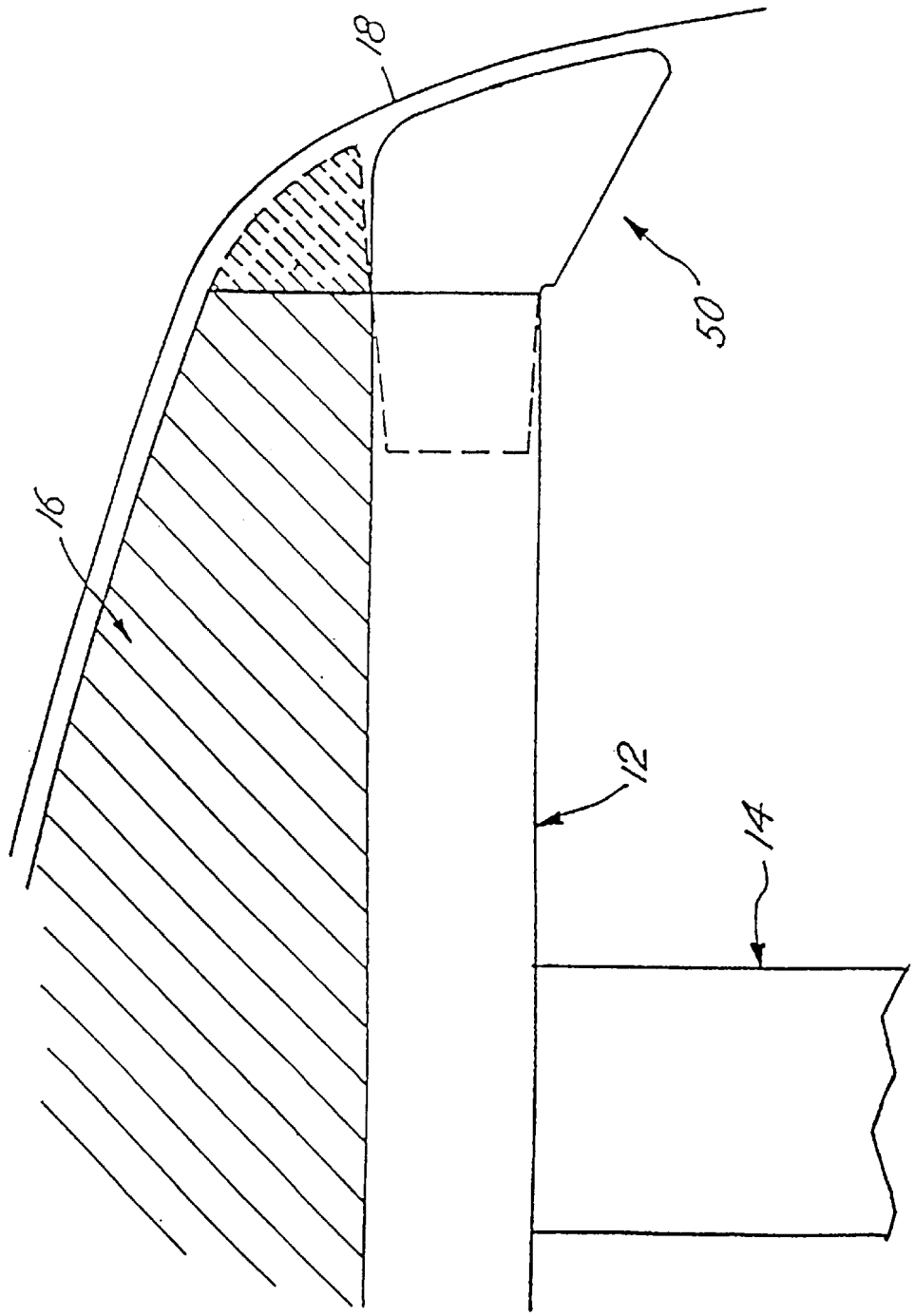
FIG. 4 is a top plan view, partly in section, of an extended blow molded end cap of the prior art.

The main body 20 is preferably configured in a rearwardly facing saddle shape as illustrated in FIGS. 2 and 3. The main body portion 20 has an upper wing 24 and lower wing 26 joined at a bight section 28. In the interface with the insert end 22, along the line B—B in the section view of the blow molded bumper beam extension of FIG. 1, shown in FIG. 2, the bight section 28 is spaced from the forward wall 30, and along the line A—A in the section view of the blow molded bumper beam extension of FIG. 1, shown in FIG. 3, the bight section 28 abuts the forward wall 30. Thus, the bight section 28 tapers until it is face to face with the forward wall 30. The configuration of the main body portion 20 provides a relatively rigid construction.

Figure 5:
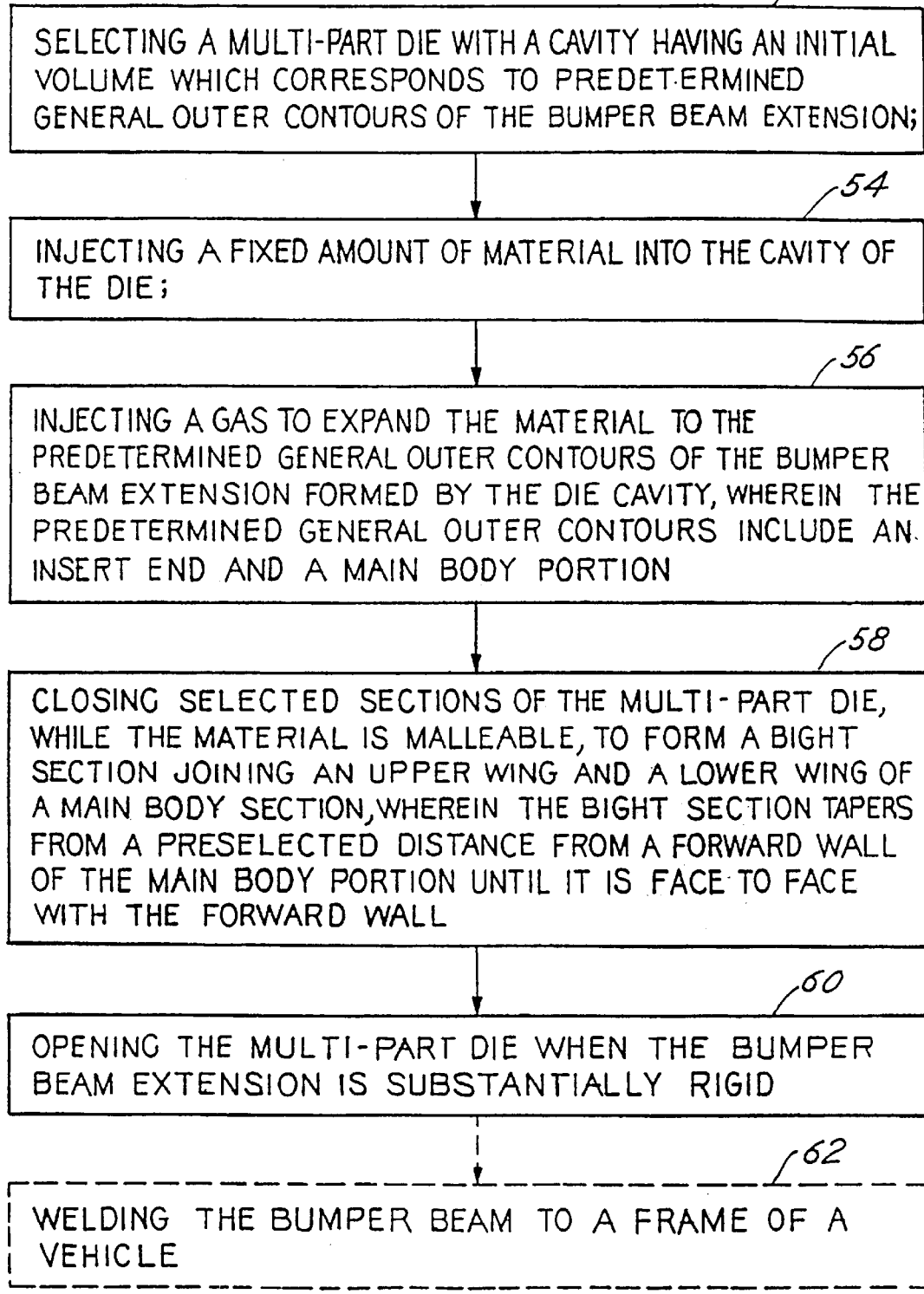
FIG. 5 shows one embodiment of steps of a method in accordance with the present invention.

FIG. 5 shows one embodiment of steps of a method in accordance with the present invention. The bumper beam extension 10 may be manufactured using blow molding techniques and multi-part dies or rotational molding techniques. A multi-part die is selected 52 to have an initial volume which corresponds to the general outer contours of the bumper beam extension. A fixed amount of material is injected 54 into the die cavity. A gas is injected 56 to expand the material to the die cavity to expand the material to the predetermined general outer contours of the bumper beam extension formed by the die cavity, wherein the predetermined general outer contours include an insert end and a main body portion. The insert end may be formed to be frictionally secured to the bumper beam, to provide an interference fit with the bumper beam, or to be secured to the bumper beam by a positive attachment.

While the material is still malleable, sections of the multi-part die close to form the bight section 28 joining an upper wing and a lower wing of a main body section, wherein the bight section tapers from a preselected distance from a forward wall of the main body portion until it is face to face with the forward wall. See step 58 in FIG. 5.

The die remains closed and is opened 60 when the bumper beam extension is rigid enough to remove.

The method may further include welding 62 the bumper beam to a frame of a vehicle (shown in dashed box in FIG. 5).

The above-described embodiment of the invention is intended to be an example of the present invention and alterations and modifications may be effected thereto, by those of skill in the art, without departing from the scope of the invention.

What is claimed is:

1. A bumper beam extension for providing crush resistance for a bumper beam, the bumper beam extension comprising:

an insert end contoured and sized to fit in an end of the bumper beam; and a main body portion having substantially a rearwardly facing saddle shape comprising an upper wing and a lower wing joined at a bight section, wherein the main body portion is blow molded to configure the bight section to taper from a preselected distance from a forward wall of the main body portion until the bight section is face to face with the forward wall.

2. The bumper beam extension of claim 1 wherein the insert end is frictionally secured to the bumper beam.

3. The bumper beam extension of claim 1 wherein the insert end provides an interference fit with the bumper beam.

4. The bumper beam extension of claim 1 wherein the insert end is secured to the bumper beam by a positive attachment.

5. The bumper beam extension of claim 1 wherein the bumper beam is further welded to a frame of a vehicle.

6. A bumper beam having a left side bumper beam extension and a right side bumper beam extension for providing crush resistance for the bumper beam, wherein each of the left and right bumper beam extensions comprises:

an insert end contoured and sized to fit in the end of the bumper beam; and a main body portion having substantially a rearwardly facing saddle shape comprising an upper wing and a lower wing joined at a bight section, wherein the main body portion is blow molded to configure the bight section to taper from a preselected distance from a forward wall of the main body portion until it is face to face with the forward wall.

7. The bumper beam of claim 6 wherein the insert end is frictionally secured to the bumper beam.

8. The bumper beam of claim 6 wherein the insert end provides an interference fit with the bumper beam.

9. The bumper beam of claim of claim 6 wherein the insert end is secured to the bumper beam by a positive attachment.

10. The bumper beam of claim 6 wherein the bumper beam is further welded to a frame of a vehicle.

* * * * *